United States Patent Office 3,623,926
Patented Nov. 30, 1971

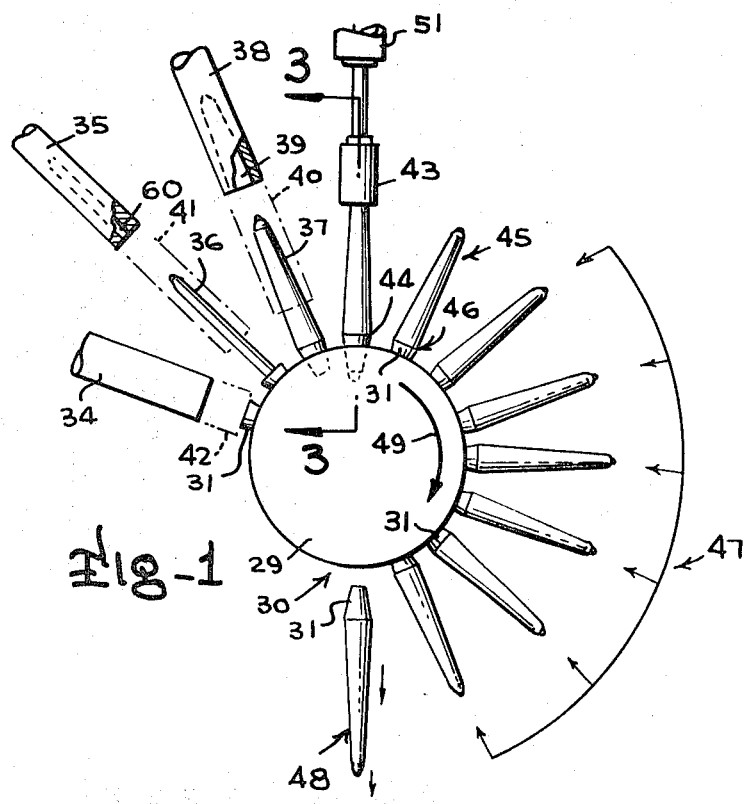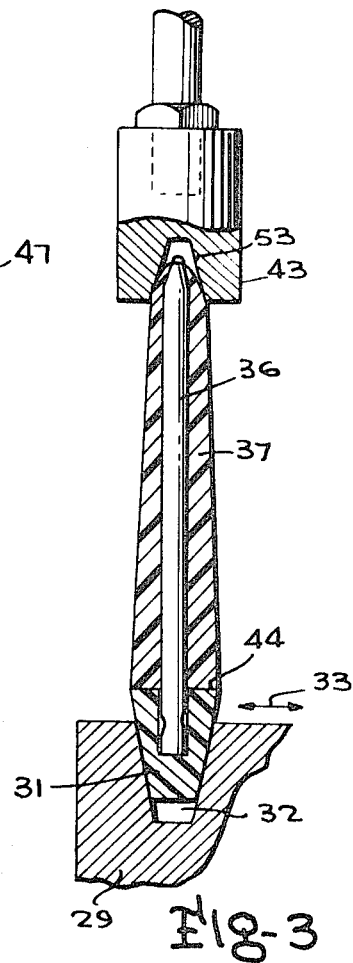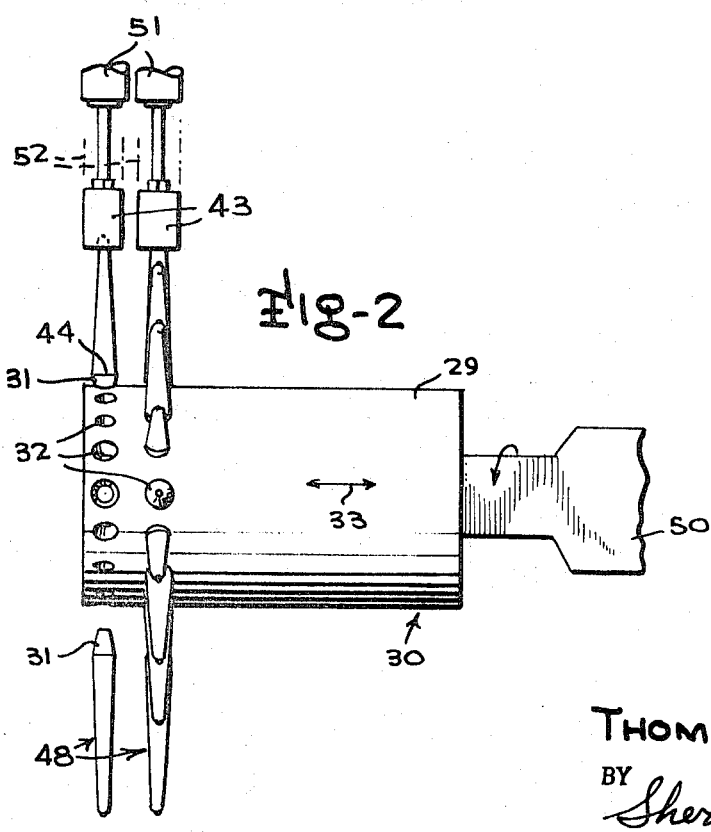

3,623,926
ULTRASONIC METHOD AND APPARATUS FOR ASSEMBLY OF THERMOPLASTIC MEMBERS
Thomas B. Sager, Plymouth Valley, Pa., assignor to Ultrasonic Systems, Inc., Farmingdale, N.Y.
Filed Mar. 26, 1969, Ser. No. 810,692
Int. Cl. B29c 27/08; B32b 31/16
U.S. Cl. 156—73
14 Claims

ABSTRACT OF THE DISCLOSURE

A method and means for continuously sealing of members together such as members made of plastic wherein there is provided an automatic feeder system and a nested rotating horn which produces or provides ultrasonic energy or kinetic energy in the form of shear waves so that the vibration direction of the horn is in shear.

---

This invention relates to a method of and means for automatically sealing members together, and more particularly to a method and means for continuously sealing members such as ball point barrels to their caps.

An object of the invention is to provide an automatic ball point pen barrel to cap sealer wherein the horn and cap are locked together in a shear mode of vibration, and wherein the nest for receiving the end caps moves sideways when the horn is energized, and wherein this is not normal to the longitudinal motion used to strike against the plastic parts to achieve a bond.

Still another object is to provide such an automatic sealer which assures maximum transmittal of energy from the horn into plastic member so that there will be no marring to the part resting in the horn, the vibration direction of the horn being in shear, and this is one of the most important aspects or features of the present invention.

Another object is to provide a method and apparatus of the character described that is both rugged in structure and foolproof in operation and which is economical to manufacture and efficient in use.

These and other objects of the invention will become apparent from a reading of the following specification and claims, together with the accompanying drawing, wherein like parts are referred to and indicated by like reference characters and wherein:

FIG. 1 is an end elevational view of the unit;

FIG. 2 is a side elevational view;

FIG. 3 is an enlarged sectional view taken on the line 3—3 of FIG. 1.

Referring in detail to the drawings, the numeral 30 indicates the automatic ball point pen barrel to cap sealer of the present invention which is shown to comprise a cylindrical horn 29 of the ultrasonic type, and the horn 29 is provided with a plurality of spaced apart cavities or nests for selectively receiving therein plastic end caps 31. In FIG. 2, the arrow 33 indicates the vibration direction of the horn in shear.

As shown in FIG. 1, there is provided an automatic feeder for the end cap 31 to move into place the end cap 31 and return so that the feeder 34 will move away from the horn 29 and permit the horn 29 to rotate freely, during the sequence of operations. The numeral 35 indicates an automatic feeder for the ink barrel 36, and the feeder 35 is adapted to have a recess 60 therein for snugly receiving a portion of the ink barrel 36. In FIG. 1, the numeral 38 indicates an automatic feeder which is adapted to move inwardly to the horn 29 for positioning the outside cover barrel 37 onto the end cap 31. The feeder 38 is provided with an inner recessed portion 39 which snugly receives therein the cover barrel 37.

In FIG. 1, the numeral 40 indicates in broken lines the motion of the automatic feeder 38 for positioning the outside cover barrel 37 in its proper location. Similarly in FIG. 1, the numeral 41 indicates or shows the motion of the feeder 35 for positioning the ink barrel 36 in place, and the numeral 42 indicates the motion of the feeder 34 in placing the end cap 31 in a nest 32, and subsequently moving away from the horn.

The numeral 43 indicates a plunger for bearing force to be applied when the horn is energized by ultrasonic energy or kinetic energy, and wherein the plunger 43 returns or withdraws from contacting the outside cover barrel 37 after the ultrasonic energy is deenergized. The numeral 44 indicates the area where bonding takes place between the outside cover barrel 37 and the end cap 31. The numeral 45 designates the outside pen cover barrel after being sealed to the end cap and no work is being done at this station. A bond has been performed at surface or point 46 between the outside cover barrel 37 and the end cap 31 and no work is being done at this station.

The completed ball point pen rides freely through the stations 47 and no work is being done. Subsequently, the completed pen falls away at the station or point 48 from the horn nest that is used to hold the cap, and this is automatic ejection due to the ultrasonic energy and geometry which causes it to free itself. In FIG. 1, the arrow 49 may indicate the direction of rotation of the horn 29. In FIG. 2, the numeral 50 indicates a portion of a conventional transducer.

As shown in the drawings, the nests 32 have a special configuration to apply pressure or bearing force to the outside end cover barrel so as to assure that there will be no surface marring or deformation of the geometry of that area during the bonding operation. In FIG. 1, the arrow 49 indicates the horn 29 rotating at 360° in a clockwise direction, but it is to be understood that this direction of rotation can be reversed to a counterclockwise direction if the feeder positions are changed, and this permits automatic sealing of pens.

The plunger 43 may have a suitable piston mechanism 51 connected thereto to provide bearing force to the outside cover pen barrel for ultrasonic bonding at the ultrasonic bonding station, and the unit 51 may be of a hydraulic or pneumatic mechanical type, or it may have any suitable conventional construction. The end portion 43 on the piston has a special configuration to mate the pen so as to prevent marring of the pen or its components. The numeral 52 in FIG. 2 indicates the movement of the piston for sealing the barrel to the end cap.

From the foregoing, it will be seen that there has been provided a method of and means for continuously sealing members together such as ball point pen barrels to their end caps and is use with the parts arranged in the drawings the horn 29 is adapted to be connected to the transducer 50 as shown in FIG. 2. The horn 29 rotates in either a clockwise direction as indicated by the arrow 49 in FIG. 1 or if desired the horn can be rotated in a counterclockwise direction. The horn 29 is provided with a plurality of spaced apart cavities or nests 32 which are adapted to selectively receive the end caps 31 that are moved in position by means of the automatic feeder 34, the feeder 34 moving in and out through the path indicated by the numeral 42.

After the caps 31 have been positioned in the nests 32, the ink barrels 36 are adapted to be positioned in place by their feeders 35, FIG. 1, and subsequently automatic feeders 38 move the outer barrels 37 in position over the ink barrels 36. Next, the pistons 43 engage the outer barrels 37 as previously described and as shown in FIG. 3, the pistons 43 are provided with recessed portions 53 for snugly receiving therein end portions of the outer barrels 37 of the ball point pens. The bond is accomplished at the area 44 between the outer barrel 37 and the end cap 31 and this bond 44 is ultrasonically formed so as to fuse or join the outer barrel 37 to the end cap 31 so that a completed ball point pen in its final assembled position is provided.

As the horn 29 continues to rotate such as in a clockwise direction in FIG. 1, the completed ball point pens will travel until they reach a position such as that indicated by the numeral 48 whereby the final assembled ball point pens or articles can drop into a suitable receptacle or other location.

The parts can be made of any suitable material and in different shapes or sizes. While the present invention has specifically illustrated and described the present invention being used for making ball point pens by automatically sealing pen barrels to caps, it is to be understood that the present invention is not limited to the formation or manufacture of such ball point pens since the principles of the present invention are applicable to various other or different types of articles besides ball point pens.

While the drawings illustrate two rows of nests or cavities 32, it is to be understood that the number of rows of nests can be varied as desired. The feeders of course are automatically actuated and are timed so that they will move in or out at the proper sequence to bring about a desired action or movement of the parts.

The principle of the system of the present invention is that the horn and cap are locked together in a shear mode of vibration. The nests provide a means for receiving the end caps or inserts in the horn and move sideways when the horn 29 is energized. This is not normal to the longitudinal motion used to strike (impact) against the plastic parts to achieve a bond. In this case, the end cap moves with the horn as it rests in the nest, and this will allow maximum transmittal of energy from the horn into the plastic end cap and under this condition there is no marring to the part resting in the horn.

In FIGS. 2 and 3, the numeral 33 refers to vibration direction of the horn 29 being in shear, and this is one of the most important aspects or features of the present invention. The horn may utilize ultrasonic energy or kinetic energy and thus the present invention includes mechanical vibrations at various frequency ranges, both in the sonic and ultrasonic ranges.

It will now be clear that there is provided a process and device which accomplishes the objective heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. In an automatic sealer, an ultrasonic horn, said horn including a plurality of spaced apart nests for selectively receiving a first member therein, means for moving a second member into juxtaposition with said first member, means for maintaining a bearing force between said members in their juxtaposition relationship, and means for vibrating said horn at an ultrasonic rate with the vibration direction being in shear to thereby effect a seal between the members.

2. In an automatic sealer as defined in claim 1, and further including
   (a) an automatic feeder for said first member to move said first member into place in said nests and return and selectively move away from the horn to allow the horn to rotate freely,
   (b) an automatic feeder for moving a second member inwardly to the horn into said juxtaposition with said first member,
   (c) a plunger for applying bearing force when the horn is energized and for returning from contacting the second member when ultrasonic energy is deenergized, and
   (d) stations for allowing the completed assembly of said members to ride freely therethrough, the completed assembly being automatically ejected from a subsequent station.

3. In an automatic sealer as defined in claim 2, including
   (a) means for first bringing said members together such that the surfaces of each of said members to be joined abut each other, and
   (b) means for maintaining said members in intimate contact with each other at said abutting surfaces during said oscillating therebetween.

4. In an automatic sealer as defined in claim 1 including means for oscillating said members relative to each other at a minute amplitude and a high frequency in a plane substantially parallel to the respective surfaces of said members to generate shear vibrations at said contacting surfaces and thereby effect a joining of said members.

5. In an automatic sealer as defined in claim 4, wherein said means for oscillating said members is obtained by introducing vibratory energy into one of said members at an ultrasonic rate and in a plane to generate said shear vibrations and thereby effect said joining.

6. In an automatic sealer as defined in claim 1, wherein said horn is adapted to be angularly rotated.

7. In an automatic ball point pen barrel to cap sealer, a transducer, an ultrasonic type cylindrical horn rotatable through a path of 360°, and said horn being operatively connected to said transducer, said horn having a plurality of spaced apart nests for receiving end caps therein, said horn being such that the vibration direction of the horn is in shear, an automatic feeder for the end caps to move the end caps into place in the nests and return and selectively move away from the horn to allow the horn to rotate freely, an automatic feeder for ink barrels to move in near the horn and to move away from the horn so that the horn can rotate freely, an automatic feeder for moving inwardly to the horn and for placing outside cover barrel contiguous to the end caps with a mechanical fit, said feeders having recessed portions for snugly receiving therein portions of the cover barrels and ink barrels, a plunger for applying bearing force when the horn is energized and for returning from contacting the outside cover barrel when ultrasonic energy is deenergized, the bonding taking place between the outside cover barrel and end cap, stations for allowing the completed ball point pens to ride freely therethrough, the completed ball point pens subsequently being automatically ejected from a subsequent station.

8. A method of continuously sealing plastic members together comprising the step of providing an ultrasonic horn, the vibration direction of the horn being in shear, positioning first members in the horn, and selectively moving second members into juxtaposition with said first members, wherein the first members are received in nests in the horn, and wherein the first members move with the horn as they rest in the nests so as to allow maximum transmittal of energy from the horn into the first members.

9. The method as defined in claim 8, and further including the step of rotating said ultrasonic horn.

10. The method as defined in claim 8, and further including the step of removing said assembled members from within said horn.

11. A method of continuously sealing plastic members together comprising the steps of rotating an ultrasonic horn, the vibration direction of the horn being in shear, positioning first members in the horn, and selectively moving second members into juxtaposition with said first members, and wherein the first members are end caps of ball point pens that are received in nests in the horn, and wherein the end caps move with the horn as they rest in the nests so as to allow maximum transmittal of energy from the horn into the end caps.

12. A method as defined in claim 11, including oscillating said members relative to each other at a minute amplitude and a high frequency in a plane substantially parallel to the respective surface of said members to generate shear vibrations at said contacting surfaces and thereby effect a joining of said members.

13. The method as defined in claim 12, and wherein said step of positioning said members includes the steps of
 (a) first bringing said members together such that the surfaces of each of said members to be joined abut each other, and
 (b) maintaining said members in intimate contact with each other at said abutting surfaces during said oscillating therebetween.

14. The method as defined in claim 11 wherein the horn and first members are locked together in a shear mode of vibration.

References Cited
UNITED STATES PATENTS 3,224,916 12/1965 Soloff et al. _____ 156—580
3,494,817 2/1970 Whitecar _____ 156—580

OTHER REFERENCES

"New Concepts In Ultrasonic Sealing," by R. S. Soloff, reprint from March 1964 issue of "Modern Plastics," (five pages).

SAMUEL FEINBERG, Primary Examiner

U.S. Cl. X.R.

156—580